US005142125A

United States Patent [19]

Fioroli et al.

[11] Patent Number: 5,142,125

[45] Date of Patent: Aug. 25, 1992

[54] DOUBLE-CHAMBER ELECTRIC OVEN WITH UNIFORM HEAT TRANSFER

[75] Inventors: Mario Fioroli, Brezzo di Bedero; Franciscus Kokkeler, Malnate, both of Italy; Johan H. de Wilde de Ligny, Groningen, Netherlands; Giovanni Franzetti, Ispra, Italy

[73] Assignee: Whirlpool International B.V., Eindhoven, Netherlands

[21] Appl. No.: 410,378

[22] Filed: Sep. 20, 1989

[30] Foreign Application Priority Data

Sep. 23, 1988 [IT] Italy .............................. 22064 A/88

[51] Int. Cl.[5] .......................... A21B 1/26; F27B 1/00

[52] U.S. Cl. ................................ 219/400; 126/21 A; 126/21 R

[58] Field of Search ........... 219/400; 126/21 A, 21 R; 99/386

[56] References Cited

U.S. PATENT DOCUMENTS 4,357,522 11/1982 Husslein et al. ................... 219/400
4,386,558 6/1983 Holman et al. .................. 126/21 A
4,827,106 5/1989 Margraf ............................. 219/400
4,829,158 5/1989 Burnham ............................ 219/400
4,870,254 9/1989 Arabori et al. .................... 219/400

FOREIGN PATENT DOCUMENTS 8323718 7/1968 Fed. Rep. of Germany .

*Primary Examiner*—Bruce A. Reynolds
*Assistant Examiner*—Tuan Vinh To
*Attorney, Agent, or Firm*—Thomas J. Roth; Stephen D. Krefman; Thomas E. Turcotte

[57] ABSTRACT

An electric oven comprising a housing (100) enclosing a cavity (6) provided on at least one wall with an electrical resistance element (7), there being provided in said cavity (6) a metal box structure (16) defining a cooking chamber (16A) which is open on one side (17) and in which food (50A, 50B) is disposed during its preparation, said box structure (16) being positioned in such a manner as to create an interspace (23, 88) between its walls (18, 19, 20) and the walls (4, 8, 22) of the cavity (6) of the oven (1).

17 Claims, 3 Drawing Sheets

DOUBLE-CHAMBER ELECTRIC OVEN WITH UNIFORM HEAT TRANSFER

FIELD OF THE INVENTION

This invention relates to an electric oven comprising a housing enclosing a cavity provided on at least one wall with electrical resistance elements.

BACKGROUND OF THE INVENTION

Although an oven of this type allows good food preparation, it has the drawback that zones of different temperature exist within its cavity.

In particular, temperature differences even of some tens of degrees can exist within said cavity, which can be particularly inconvenient during food preparation. Such temperature differences can lead, for example, to good surface cooking (or color) of those food parts present in the high temperature zones and less surface cooking of other parts present in those cavity zones in which the temperature is lower. This drawback is particularly important in the preparation of cakes and sweets in general since in such cases those parts of the cake located in the hotter zones of the oven cavity become properly cooked whereas those parts located in the cooler zones remain insufficiently cooked.

SUMMARY OF THE INVENTION

The overall object of the present invention is to provide an oven of the aforesaid type which overcomes the drawbacks of known ovens.

Specifically, an object of the invention is to provide an oven which allows uniform preparation, and in particular cooking, of the food placed in it.

These and further objects which will be more apparent to the expert of the art are attained by an electric oven of the aforesaid type, having provided in its cavity a metal box structure which is open on one side and in which the food is disposed during cooking or heating, said box structure being positioned in such a manner as to create an interspace between its walls and the walls of the oven cavity.

Preferably, the oven is of the ventilated type to create forced air circulation through the interspaces present between the walls of its cavity and the box structure.

BRIEF DESCRIPTION OF THE DRAWING

The present invention will be more apparent from the accompanying drawing which is provided by way of non-limiting example and in which.

DETAILED DESCRIPTION OF THE PREFERRED EMBODIMENTS

Figure 1:
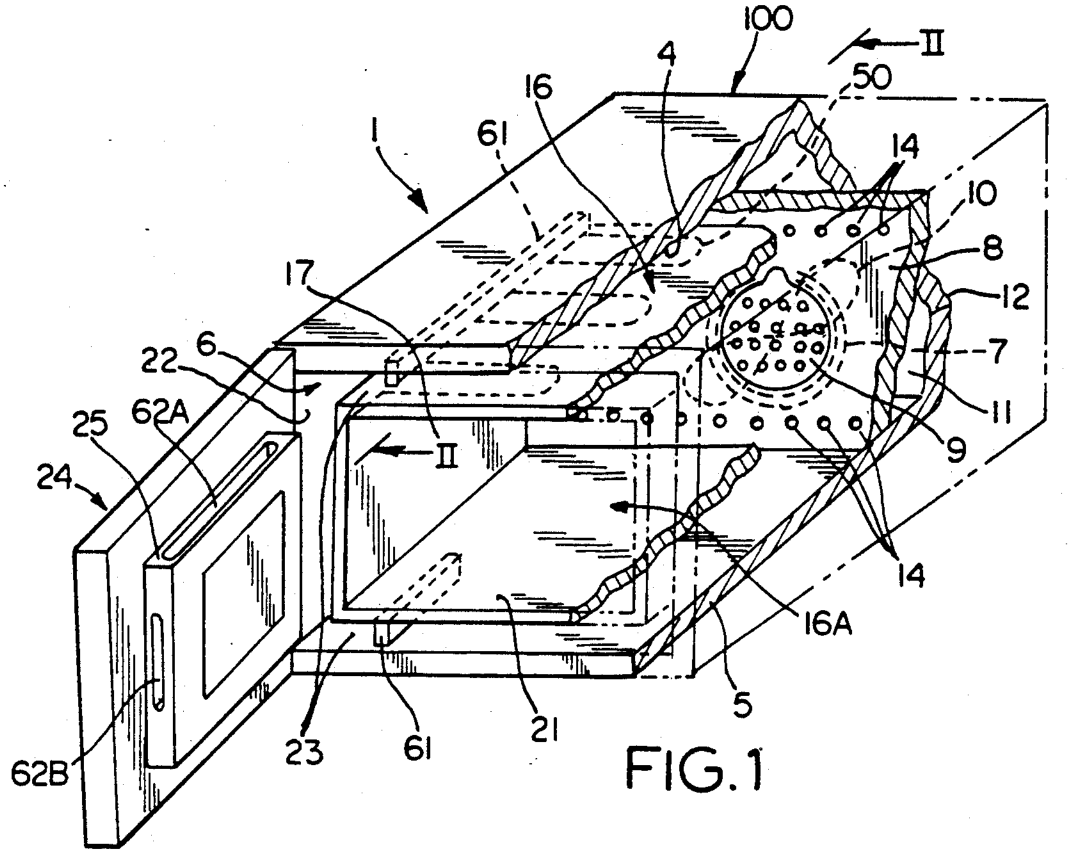
FIG. 1 is a perspective sectional view of an oven according to the invention.
Figure 2:
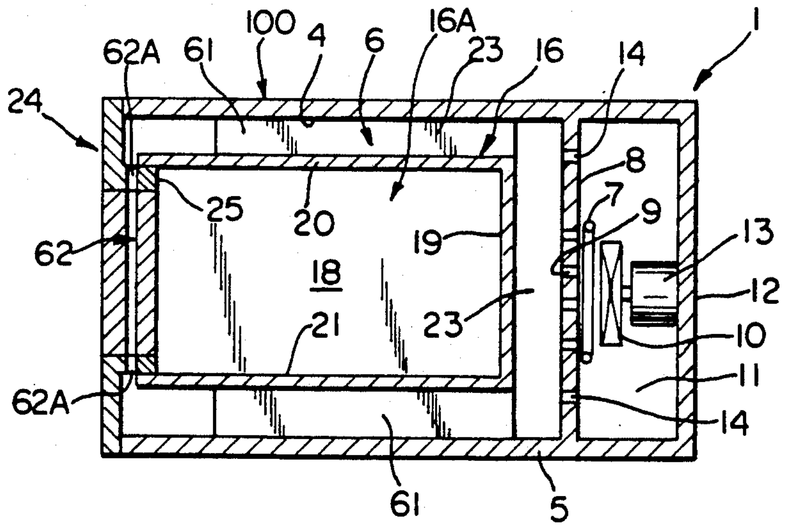
FIG. 2 is a section on the line II—II through the oven of FIG. 1, but with its door closed.

FIGS. 1 and 2 show a ventilated oven 1 provided with an inner cavity 6 (called hereinafter the heating chamber) provided with a roof 4, a lower wall 5 and an end wall 8 beyond which an electrical resistance element is provided in proximity to a grille 9 associated with the end wall 8. In proximity to the grille 9 there is preferably provided a fan 10 inserted in a compartment 11 present between the end wall 8 and the rear wall 12 of the housing 100 of the oven 1. The fan 10, which, for example, may be of the tangential type, is provided with a motor 13 located in compartment 11 to obtain forced air circulation within the oven 1. For this purpose, in addition to the grille 9 there are further apertures 14 in the end wall 8 for the forced air circulation.

The fan 10 (see FIG. 6) feeds the air forcibly into the heating chamber 6 through the apertures 14 (arrows F) and draws in said air (arrows G) through the grille 9.

In a modified embodiment the fan 10 is of the axial type. In this case the forced air is fed into the heating chamber 6 through the grille 9 and drawn into the compartment 11 through the apertures 14. The usual deflectors are provided in proximity to the apertures 14 to allow good air recirculation through the compartment 11.

A box structure 16 open on one side 17 is disposed in a suitable manner on the lower wall 5 of the heating chamber 6 and is secured in known manner. Structure 16 is kept at a short but equal distance from the upper wall or roof 4 and from the lower wall 5 of the heating chamber 6 by spacers 61 provided on the lower wall 21 (on which the food is placed for preparation) and on the upper wall or roof 20 of structure 16. Structure 16 also comprises side walls 18 and an end wall 19. In this manner between the walls 18, 19, 20 and 21 of the structure 16 (defining a cooking chamber 16A) and the side walls 22, roof 4, end wall 8 and lower wall 5 of the heating chamber 6 there are created identical interspaces 23 through which forced air circulation takes place. For this purpose (see FIG. 6) the spacers 61 also act as forced air deflectors and direct this air from the upper and lower parts of the structure 16 (arrows F) to its side parts (arrow W) to enclose the structure 16 with the flow of air heated by the resistance elements 7 located in proximity to the fan 10, this air then being drawn in by the fan 10 through the grille 9. The hot air which grazes the box structure 16 heats the walls 18, 19, 20 and 21 of said structure. The walls then heat the food in the structure by radiation, i.e. heat transfer. As all the walls 18, 19, 20 and 21 are substantially at the same temperature the irradiation of the food and heat transfer thereto is very uniform and its preparation is very satisfactory.

Figure 3:
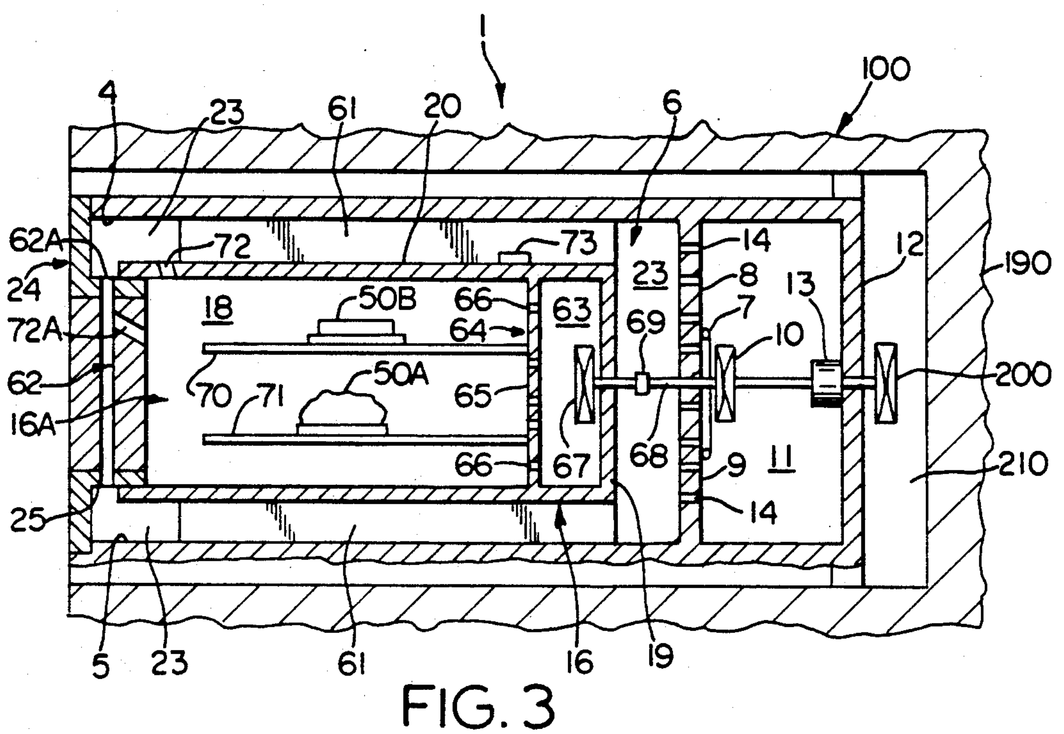
FIG. 3 is a section analogous to that of FIG. 2, but of a different embodiment of the invention.

The box structure 16 is positioned with its open side 17 towards the aperture in the housing 100 of the oven 1. This aperture is closed by a door 24 which in the embodiments of FIGS. 1 and 2 and of FIG. 3 is provided with an inner projecting part 25 to enable the open side 17 of the box structure 16 to be also closed. Preferably within the door 24 there is provided an interspace 62 having upper and lower apertures 62A and side apertures 62B, and of width substantially equal to the width of the side 17 of the door 16, so that the air can circulate through it in order to graze structure 16 also on its front side.

Specifically, air enters the interspace 62 through the apertures 62A and leaves through the apertures 62B so as to externally graze the side walls 18 of the box structure 16 after grazing the upper wall 20 and lower wall 21.

However, in a further embodiment (not shown), the box structure 16 is provided with its own door, and in this case the door 24 of the oven 1 is not provided with the projection 25, door 24 being only a short distance from that of the structure 16 to enable forced air to circulate between them.

The structure 16 can also be provided with a resistance element 50, preferably of silk-screen application, disposed on one of its walls such as the upper wall 20. Such resistance element 50 enables a food placed in the cooking chamber 16A of the structure 16 to be browned to the required extent, or grilled.

In another embodiment (see FIG. 3) a fan 67 can be provided in the structure 16 and fitted to the drive shaft 68 of the fan 10, to be driven by the motor 13.

Fan 67 (which as in the case of the fan 10 can be tangential or axial) is located in a compartment 63 defined between a partition wall 64 and the end wall 19 of the structure 16. To obtain air circulation within the cooking chamber 16A of the structure, the wall 64 is provided with apertures 66 and a grille 65 located in front of the fan 67.

Again in this case forced air circulation is obtained within the cooking chamber 16A for the preparation of food 50A and 50B placed on shelves 70 and 71 removably inserted into cooking chamber 16A. Preferably fan 67 can be separated from the drive shaft 68 by means of a coupling 69 which can be operated from the outside of the oven 1, so that the fan 67 need be operated only when necessary.

If the oven is mounted in a kitchen cabinet 190, fan 200 is provided (see FIG. 3) on the outside of oven 1 beyond the rear wall 12, and is preferably operated by the motor 13 of the fan 10 disposed in the oven. The fan 200, disposed in a cavity 210 provided in the cabinet 190, creates forced air circulation around the oven 1 to prevent overheating of the cabinet 190 during the use of the oven.

In all of the various embodiments of the oven 1, a passage (indicated by 72 in FIG. 3) can be provided within the roof 20 of the box structure 16 or within its door (if provided) or within the projecting part 25 of the door 24 of the oven 1, to allow the fumes released within the cooking chamber 16A during food preparation to be removed by natural convection. This passage or flue, which can preferably be of the type which can be closed by an automatically or manually operated member or damper, enables the moisture released within the cooking chamber 16A during food preparation to be discharged to the outside.

In addition, to control the temperature reached by the walls 18, 19, 20 and 21 of the box structure 16 and thus the temperature in the cooking chamber 16A there is provided at least one temperature sensor (indicated by 73 in FIG. 3) disposed for example in the roof 20 of the structure. To allow better temperature distribution within the cooking chamber 16A, these walls are preferably lined on their inner side with thin sheets of a good heat-conducting material such as aluminum.

Preferably, the box structure 16, defining substantially a cooking chamber 16A of uniform temperature, can also be removably insertable into the heating chamber 6 of the oven 1 and removably fixable therein. In this manner the user can use the structure 16 only in particular situations, such as to obtain optimum preparation of a cake.

In particular, the structure 16 can also be of the foldable type, in which case known fixing elements (such as spring clips) are provided on the walls of the structure to stabilize the walls during the use of the structure 16 in the oven 1. In such a case, gaskets are provided on the ends of the foldable sides to provide the thermal seals necessary for proper operation of the oven.

Additionally, (see FIGS. 4, 5 and 6), if the oven is provided with a non-removable structure 16 to prevent heat leakage from the heating chamber 6 of the oven 1, a closure plate 83 is disposed facing the door 24 around that part of the structure close to the door to hermetically seal the structure within the heating chamber 6. The plate 83 is substantially of annular shape with a contour complementary to that of the cavity or heating chamber 6 of the oven 1. In this manner the plate can be mounted on the structure 16 and thus be introduced into the oven 1.

The plate 83 has a peripheral shape to enable it to engage both the walls 4, 5, 22 of the cavity 6 of the oven 1 and the box structure 16. On this peripheral part there are also provided known means for obtaining a sealed engagement.

The presence of the plate 83 prevents the forced hot air circulating within the heating chamber 6 of the oven 1 from also grazing the front of the box structure 16. However to enable the air to graze and heat the side walls 18 of the structure 16, the spacers 61 are provided as started, and act as deflectors for the forced air. Alternatively, (see FIG. 6), the roof or upper 20 and the lower wall 21 of the structure 16 have dimensions such that they project laterally from the structure so as to create with the side walls 22 of the heating chamber 6 the interspace 88 for recirculating the forced air to the sides to said structure 16. In addition, within said roof 20 and said lower wall 21 there are provided ducts 84 which channel the air moved by the fan 10 and guide it towards side apertures 85 provided in the roof 20 and in the walls 21. The hot air can pass into the side interspaces 88 and be drawn in by the fan 10 through the apertures (as indicated by arrows W and G).

Figure 4:
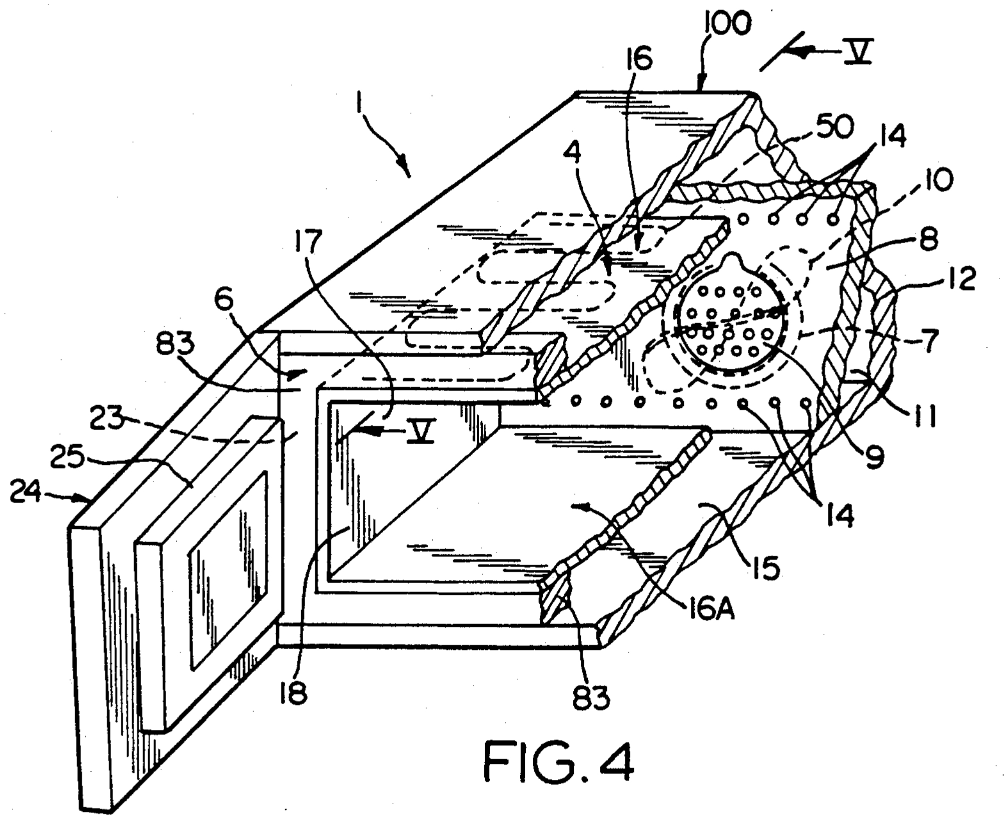
FIG. 4 is a view analogous to that of FIG. 1 but of a still further embodiment of the invention.
Figure 5:
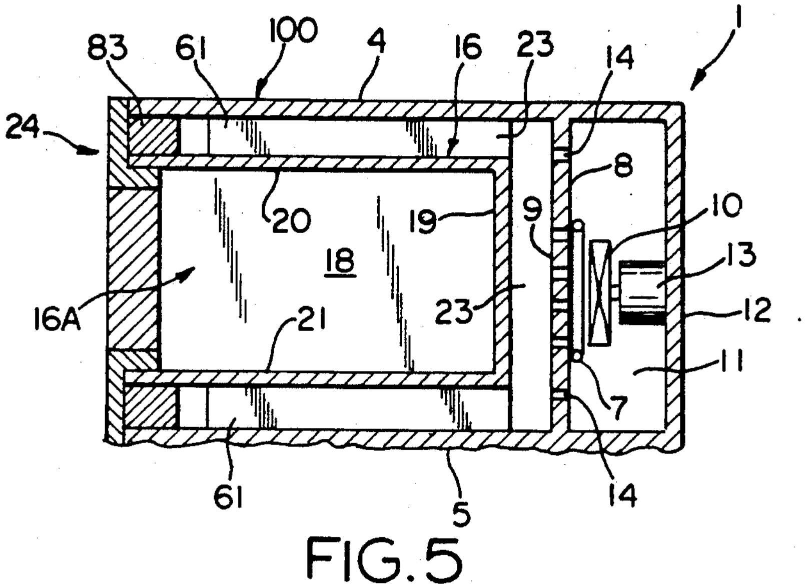
FIG. 5 is a section on the line V—V through the oven of FIG. 4, but with its door closed.
Figure 6:
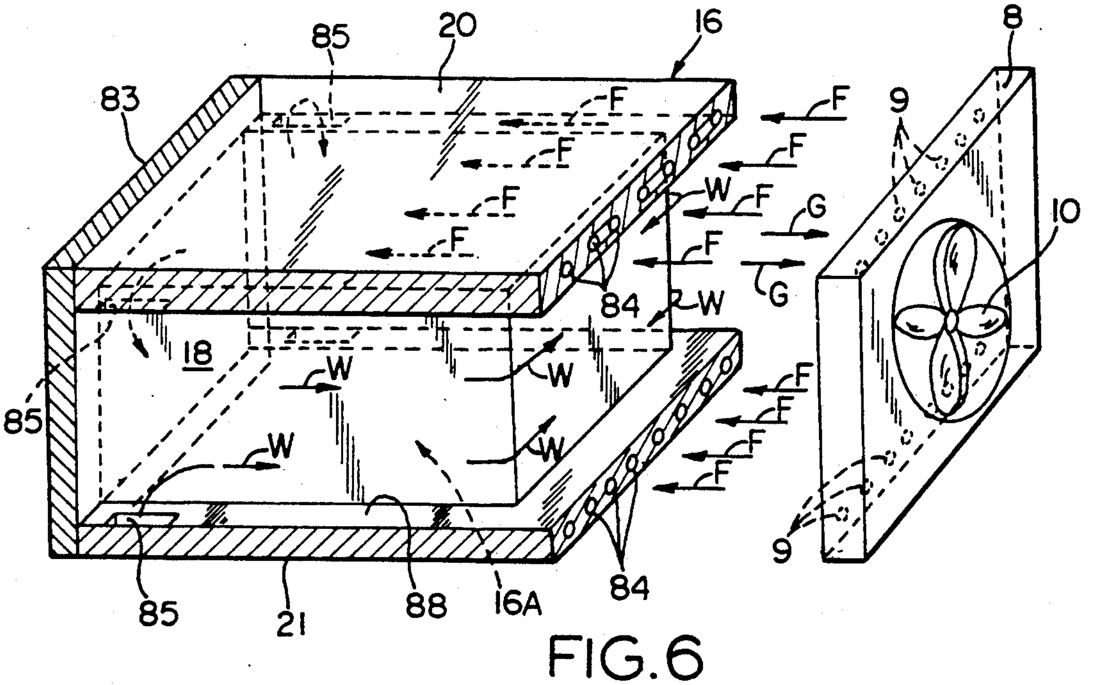
FIG. 6 is a diagrammatic view of an oven part constructed in a different manner from that of the preceding figures.

In FIGS. 4, 5 and 6 parts identical to those of the already described FIGS. 1, 2 and 3 are indicated by the same reference numerals.

For purposes of further illustration, it will now be assumed that a food 50A, such as a cake, is to be cooked in an oven of the type shown in FIGS. 1 and 2. The cake 50A is firstly positioned in the cooking chamber 16A of the box structure 16 after which the door 24 of the oven 1 is closed. In this manner (in the example illustrated in said figures) the box structure is also closed.

The oven 1 is switched on and the fan 10 operated to circulate forced air, the resistance element 7 thus generating heat to heat the air circulated by the fan 10. This air grazes the structure 16 to heat its walls 18, 19, 20 and 21 in a substantially uniform manner. Said walls radiate heat in such a manner as to create within the cooking chamber 16A a uniform temperature enabling the cake 50A to cook equally in all its parts, and in particular to possess a uniform surface colour when cooking is complete.

An oven constructed in accordance with the present invention enables food to be properly cooked in all its parts and to obtain a surface coloration which is more uniform than that obtainable with ovens heretofore known in the art.

We claim:

1. An electric oven comprising a housing (100) enclosing a cavity (6) provided with walls (4, 5, 8), at least one of which includes an electrical resistance element, said cavity (6) containing a metal box structure (16) defining a cooking chamber (16A) which is open on one side (17) and in which food (50A, 50B) may be disposed during cooking, said box structure (16) being positioned in such a manner as to create an interspace (23, 88) between its walls (18, 19, 20, 21) and the walls (4, 8, 5, 22) of the cavity (6) of the oven (1), the box structure (16) comprising on its lower wall (21) and upper wall (20) elements (61) for spacing said structure (16) from the walls of the cavity (06) of the oven (1) and to act as deflectors for the forced air circulating within said cavity (6), the walls (18, 19, 20, 21) of the box structure being substantially uniformly heated by hot air circulating in said interspace, food contained in the box structure being heated by a substantially uniform transfer of heat from the walls of the box structure.

2. An oven as claimed in claim 1, comprising means (10, 9, 14) for generating forced air circulation within the oven (1), said air flowing within the interspace (23, 88) present between the housing (100) of the oven (1) and the box structure (16).

3. An oven as claimed in claim 1, wherein a door (24) for the oven (1) comprises an inner projecting part (25) arranged to close the box structure (16).

4. An oven as claimed in claim 3, wherein an interspace (62) is provided in the door (24) of the oven (1) for circulating forced air along the front of the box structure (16).

5. An oven as claimed in claim 1, wherein the box structure (16) is provided with its own door.

6. An oven as claimed in claim 3 or 5 wherein a flue (72) is provided in the box structure (16) for removing from the cooking chamber (16A) the fumes released during the food preparation, said flue (72) being advantageously provided in the roof (20) of said structure (16) or in the door which closes its open side (17).

7. An oven as claimed in claim 1 comprising at least one temperature sensor means (73) associated with at least one wall (20) of the box structure (16).

8. An oven as claimed in claim 1 wherein the walls (18. 19, 20, 21) of the box structure (16) are lined with heat-conducting material.

9. An oven as claimed in claim 8 wherein the heat-conducting material is aluminum.

10. An electric oven comprising a housing (100) enclosing a cavity (6) provided with walls (4, 5, 8). at least one of which includes an electrical resistance element, said cavity (6) containing a metal box structure (16) defining a cooking chamber (16A) which is open on one side (17) and in which food (50A, 50B) may be disposed during cooking, said box structure (16) being positioned in such a manner as to create an interspace (23, 88) between its walls (18, 19, 20, 21) and the walls (4, 8, 5, 22) of the cavity (6) of the oven (1), the box structure (16) being removably inserted into the oven (1) and removably fixed therein, the walls (18, 19, 20, 21) of the box structure being substantially uniformly heated by hot air circulating in said interspace, food contained in the box structure being heated by a substantially uniform transfer of heat from the walls of the box structure.

11. An oven as claimed in claim 10, comprising means (10, 9, 14) for generating a forced air circulation within the oven (1), said air flowing within the interspace (23, 88) present between the housing (100) of the oven (1) and the box structure (16).

12. An oven as claimed in claim 10, wherein a door (24) for the oven (1) comprises an inner projecting part (25) arranged to close the box structure (16).

13. An oven as claimed in claim 10, wherein an interspace (62) is provided in the door (24) of the oven (1) for circulating forced air along the front of the box structure (16).

14. An oven as claimed in claim 10, wherein the box structure (16) is provided with its own door.

15. An oven as claimed in claim 10, wherein a flue (72) is provided in the box structure (16) for removing fungus from the cooking chamber (16A) during the food preparation, said flue (72) being advantageously provided in the roof (20) of said structure (16) or in the door which closes its open side (17).

16. An oven as claimed in claim 10, comprising at least one temperature sensor means (73) associated with at least one wall (20) of the box structure (16).

17. An oven as claimed in claim 10, wherein the walls (18, 19, 20, 21) of the box structure (16) are lined with heat-conducting material.

* * * * *